United States Patent
Nishizawa

(10) Patent No.: US 6,473,267 B2
(45) Date of Patent: Oct. 29, 2002

(54) FLOPPY DISK DRIVE UNIT WITH MOUNTING PLATE BETWEEN CARRIAGE AND LOWER MAGNETIC HEAD

(75) Inventor: Hiroshi Nishizawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 64 days.

(21) Appl. No.: 09/726,127

(22) Filed: Nov. 30, 2000

(65) Prior Publication Data

US 2001/0040768 A1 Nov. 15, 2001

(30) Foreign Application Priority Data

Dec. 1, 1999 (JP) ............................................. 11-342493

(51) Int. Cl.$^7$ ........................... G11B 21/16; G11B 5/48; G11B 21/22; G11B 5/54
(52) U.S. Cl. .................................. 360/246.1; 360/255.1
(58) Field of Search ..................... 360/246.1, 245.4, 360/245.2, 245.3, 245, 266.2, 266.5, 294.2, 255.1

(56) References Cited

U.S. PATENT DOCUMENTS

| | | | | |
|---|---|---|---|---|
| 4,433,352 A | * | 2/1984 | De Marco et al. | ........ 360/246.3 |
| 4,713,706 A | * | 12/1987 | Oosaka et al. | ........... 360/266.9 |
| 4,811,140 A | * | 3/1989 | Enami et al. | ................ 360/118 |
| 4,811,143 A | * | 3/1989 | Ohashi et al. | ........... 360/130.2 |
| 5,293,289 A | * | 3/1994 | Nagase | ..................... 360/246.1 |
| 5,442,504 A | * | 8/1995 | Nagase et al. | ........... 360/245.4 |

FOREIGN PATENT DOCUMENTS

| | | |
|---|---|---|
| JP | 4-149816 | 5/1992 |
| JP | 6-52049 | 7/1994 |
| JP | 7-10851 | 2/1995 |

* cited by examiner

*Primary Examiner*—Hoa T. Nguyen
*Assistant Examiner*—Julie Anne Watko
(74) *Attorney, Agent, or Firm*—McDermott, Will & Emery

(57) ABSTRACT

The height of the lower head is equal to that of the upper heads. A mounting plate is provided between the lower head and a carriage to provide penetration arrangement. The lower head is fixed on the carriage through the mounting plate with adhesive. The mounting plate has a rough area having small holes to provide surely adhering with accuracy. The thickness of the mounting plate is accurate because of punching (cutting) processing and is greater than that of the shutter. The width of the mounting plate is greater than that of the lower head but smaller than the shutter opening of the floppy cartridge to avoid influence to the motion of access of the magnetic head to the floppy disk. The gimbal plate for the lower magnetic head is omitted, so that the orientation of said lower magnetic head is fixed.

6 Claims, 7 Drawing Sheets

FLOPPY DISK DRIVE UNIT WITH MOUNTING PLATE BETWEEN CARRIAGE AND LOWER MAGNETIC HEAD

BACKGROUND OF THE INVENTION

1. Field of the Invention

This invention relates to a floppy disk drive unit.

2. Description of the Prior Art

Floppy disk drive units for recoding and reproducing data on a floppy disk are known. In such a floppy disk drive unit has upper and lower magnetic heads pinching a recoding medium of a floppy disk. The height of the lower magnetic head on the base of the carriage is offset to make the top surface of the lower magnetic head slightly higher than the recording medium to provide stable reproduction.

Japanese utility model application provisional publication No. 6-52049 discloses a floppy disk drive unit including upper and lower magnetic heads having the same height with a protruding portion formed on a gimbal on the base of the carriage.

Japanese utility model application provisional publication No. 7-10851 also discloses a floppy disk drive unit including upper and lower magnetic heads having the same height with a protruding portion on a gimbal on the base of the carriage.

In the floppy disk drive units disclosed in both documents, upper and lower magnetic heads pinch a magnetic medium contained in a floppy disk cartridge for reproducing and recording. The lower magnetic head is mounted on a lower gimbal plate for controlling the orientation of the lower magnetic head through a protruding portion which is upwardly protruded to provide penetration to the magnetic medium for reading and recording without difference in the heights of the upper and lower magnetic heads for the penetration.

The penetration is such that the magnetic recording medium is reproduced and recorded with the center plane of the elastic magnetic recording medium slightly offset upwardly to provide stable reproducing and recording. In both prior arts, heights of the upper and lower magnetic heads are the same, so that the common magnetic heads can be used for lower cost.

SUMMARY OF THE INVENTION

The aim of the present invention is to provide a superior floppy disk drive unit.

According to the present invention, a first aspect of the present invention is a floppy disk drive unit comprising: floppy disk supporting means for rotatably supporting a recording medium disk in a floppy disk cartridge having a shutter for accessing said recording medium; a head carriage assembly which is movable in the radial direction of said recording medium disk including: a carriage and an upper arm having lower and upper magnetic heads at their tips, respectively, said upper arm and said carriage being symmetrically arranged with respect to the center plane of said floppy disk cartridge which is parallel to a rotating plane of said recording medium disk and pinching said recording medium disk with said lower and upper magnetic heads while said recoding medium disk is set on said floppy disk supporting means; and a mounting plate between said lower magnetic head and said carriage having a predetermined constant thickness and a predetermined width in the tangent direction of said floppy disk which is greater than that of the lower magnetic head and smaller than that of said shutter, wherein said upper and lower magnetic heads include common magnetic heads having the same height in a direction perpendicular to said rotating plane and said lower magnetic head is fixed on said carriage through said mounting plate which provides penetration of said lower magnetic head to said recording medium disk toward said upper magnetic head. The orientation of said lower magnetic head is fixed because of absence of the gimbal plate.

Preferably, said predetermined thickness is greater than the thickness of said shutter.

Preferably, said mounting plate comprises a punched thin plate.

Preferably, a surface of said mounting plate on which said carriage is fixed has a rough area including holes in said mounting plate and said head carriage assembly further includes an adhesive layer for adhering said rough area to said carriage.

Preferably, said upper arm further includes a gimbal plate and said upper magnetic head is fixed on said upper arm through said gimbal plate.

Preferably, said mounting plate has a through hole for positioning the lower magnetic head.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
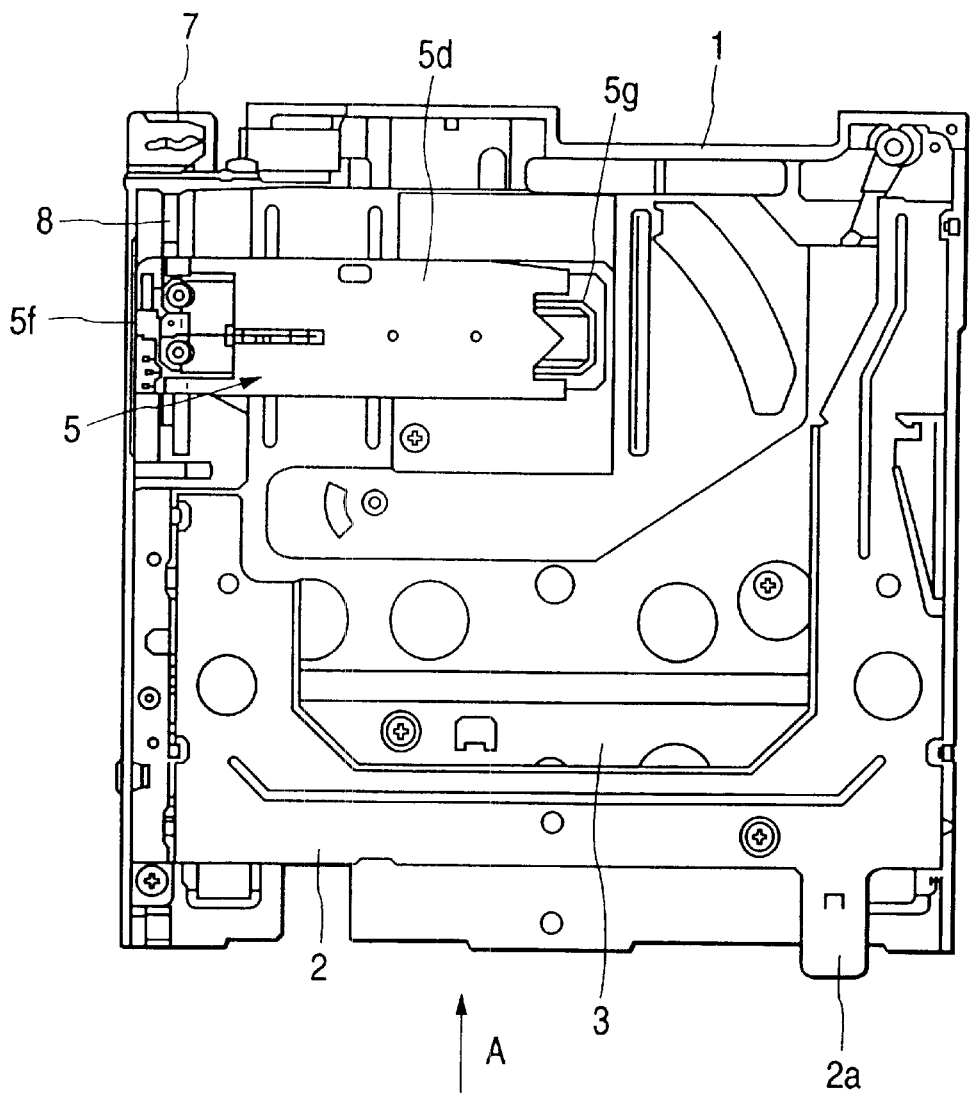
FIG. 1 is a plan view of a main portion of a floppy disk drive unit according to an embodiment of the present invention.

FIG. 1 shows a plan view of a main portion of a floppy disk drive unit according to an embodiment of the present invention. The floppy disk drive unit has a base plate 1 made of an iron plate having a thickness of 0.8 mm for example. An ejection lever portion 2 and a holder 3 are fixed to the base plate 1. Thus, a floppy disk can be inserted into the floppy disk drive unit in the direction A and depressing the ejection lever 2a of the ejection lever portion 2 ejects the floppy disk.

Figure 2A:
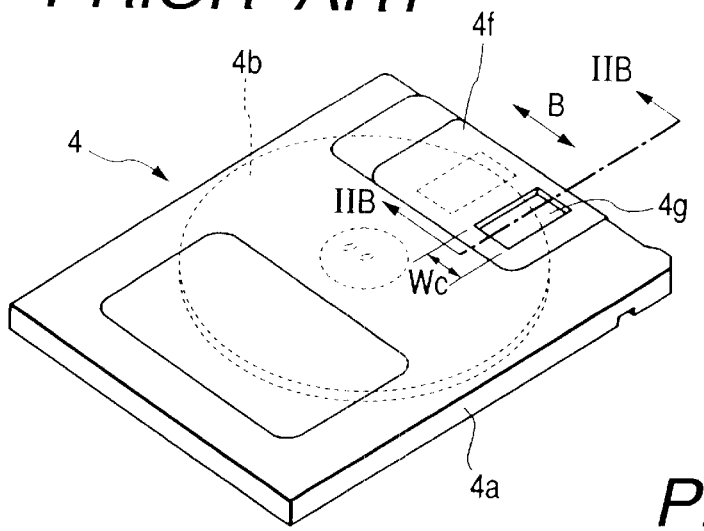
FIG. 2A is a perspective view of a floppy disk of a prior art.

FIG. 2A is a perspective view of the floppy disk. The floppy disk includes an elastic magnetic recording medium 4b having a disk shape and a plastic cartridge 4a containing the magnetic recording medium rotatably.

The magnetic recording medium 4b includes a PET (polyethylene terephthalate) disk having a thickness of 0.08 mm of which both surfaces are coated with magnetic material and a hub 4c at the center of the PET disk, made of a magnetic stainless steel to be attracted by a hub magnet 23. The hub 4c has a driving hole 4e and a positioning hole 4d. The cartridge 4a has windows (opening) 4g for accessing of the upper and lower magnetic heads 10 and 12 to the magnetic recording medium 4b and a shutter 4f for covering the windows 4g and opening the window by sliding movement of the shutter 4f having shutter window 4h in the direction B when the cartridge 4a is inserted in the floppy disk drive unit. Thus, the upper and lower magnetic heads 10 and 12 can access to data on the recording medium through the window 4g and the shutter window 4h when the cartridge 4a is inserted in the floppy disk drive unit to read or record data thereon.

Figure 2B:
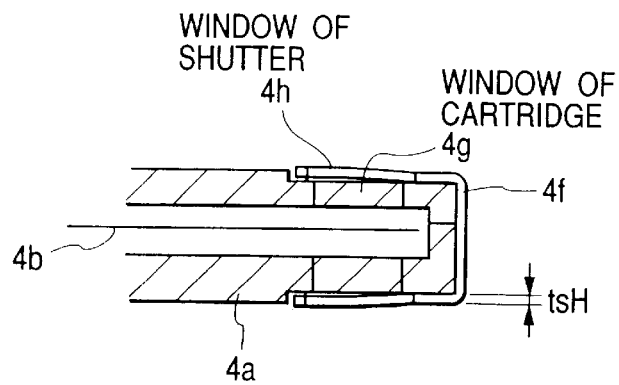
FIG. 2B is a partial cross-sectional view taken on the line IIB in FIG. 2A.
Figure 3:
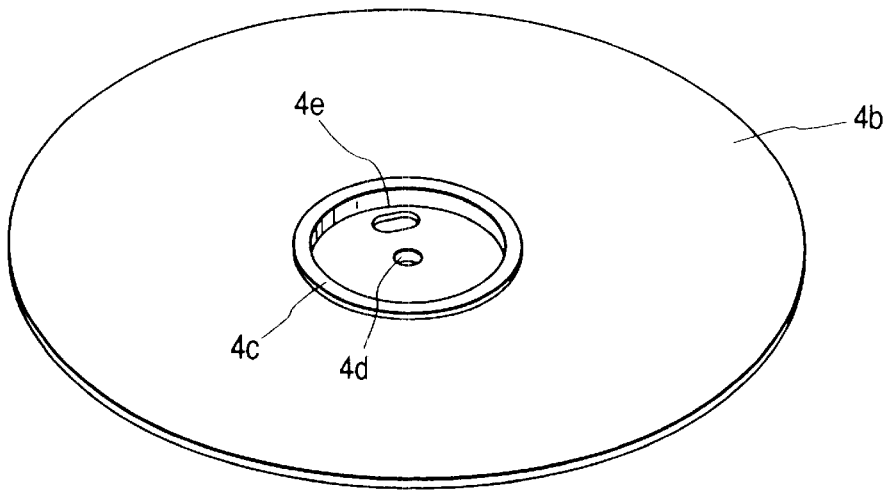
FIG. 3 is a partial perspective view of a floppy disk of the prior art.

FIG. 2B is a partial cross-sectional view taken on the line IIB in FIG. 2A. The shutter 4f has a thickness tSH and shutter windows 4h for accessing of the upper and lower magnetic heads 10 and 12.

Figure 4:
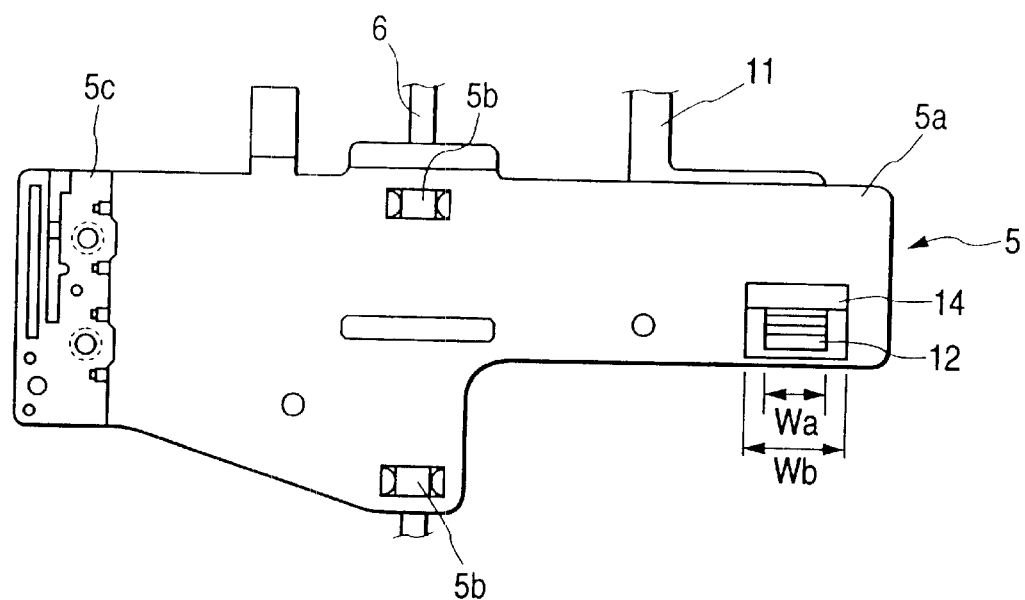
FIG. 4 is a plan view of the head carriage according to this embodiment.
Figure 5:
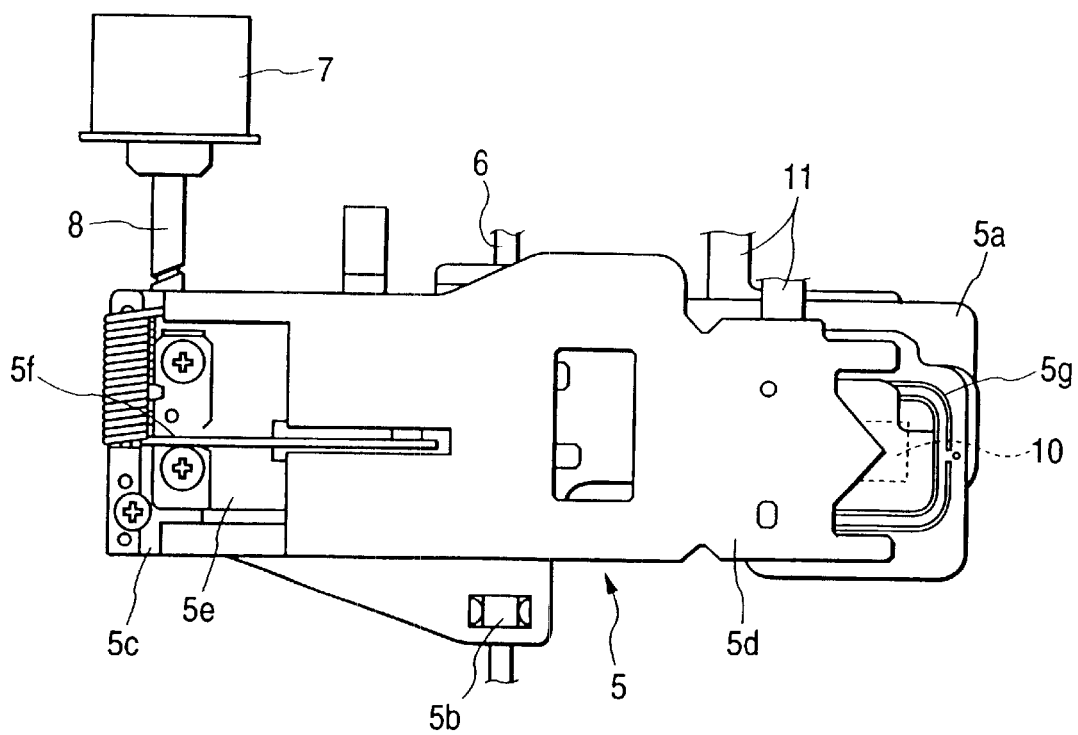
FIG. 5 is a plan view of the head carriage assembly according to this embodiment.
Figure 6:
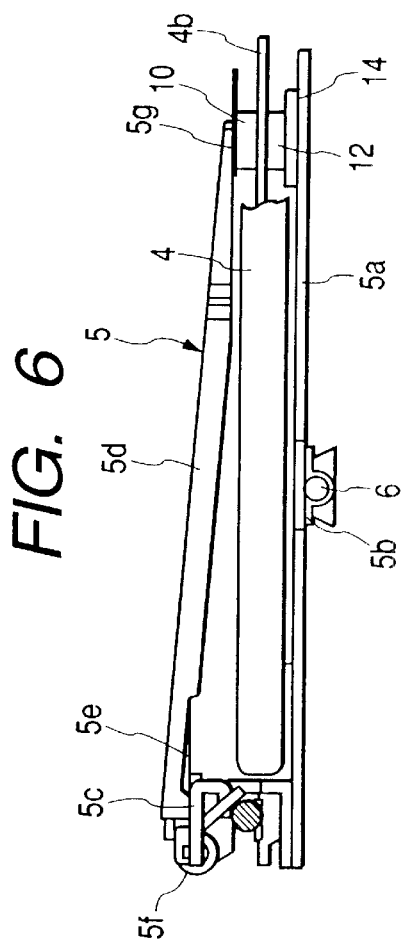
FIG. 6 is a side view of the head carriage according to this embodiment.

In FIG. 1, at the back place on the base plate 1, a head carriage assembly 5 is provided. FIG. 4 is a plan view of the head carriage 5a and FIG. 5 is a plan view of the head carriage assembly 5. FIG. 6 is a side view of the head carriage assembly 5.

The head carriage assembly 5 includes carriage 5a made of a steel (or stainless) plate having a thickness of 0.6 mm for example. The carriage 5a has a bearing 5b fixed at the bottom of the carriage 5a movably supported along a guide rod 6 which is arranged in the direction A which is the same direction of the floppy inserting direction.

The bearing 5b is made of oil impregnation sintered copper alloy metal and is movably supported by the guide rod 6 without rattle. This allows the head carriage assembly 5 to smoothly move in the radial direction (track arrangement direction) of the magnetic recording medium 4b by the step motor 7 using a lead screw 8. To the base side of the carriage 5a, a supporting member is fixed. More specifically, an upper surface of the supporting member 5c rotatably supports the base of the arm 5d by a plate spring 5e made of a stainless steel thin plate having a thickness of 0.05 to 0.1 mm as a hinge mechanism for upwardly and downwardly moving the tip of the arm 5d to provide the open and close conditions of the arm 5d. The hinge mechanism is spring-loaded with a coil spring 5f to provide the open condition of the arm 5d by actuating the arm 5e upwardly.

At the tip of the arm 5d, a gimbal spring 5g made of a beryllium copper or stainless steel thin plate on the lower surface of the arm 5d. The upper magnetic head 10 is mounted on the lower surface of the gimbal spring 5g.

The magnitude of the actuating force of the coil spring 5f is set to 10 to 20 gf in consideration of the friction characteristic and the output signal characteristic of the upper magnetic head 10.

The upper magnetic head 10 is electrically connected with a control circuit of the floppy disk drive unit with a flexible cable 11.

In FIG. 6, the lower magnetic head 12 is provided under the upper magnetic head 10 at the tip of the arm 5d.

The lower magnetic head 12 is fixed on the upper surface of the carriage 5a through a mounting plate 14 with adhesive.

The magnetic recording medium 4b is rotated by a spindle motor 15 with the upper and lower magnetic heads 10 and 12 pinching the magnetic recording medium 4b to provide contact with upper and lower surfaces of the recording medium 4b.

Figure 7:
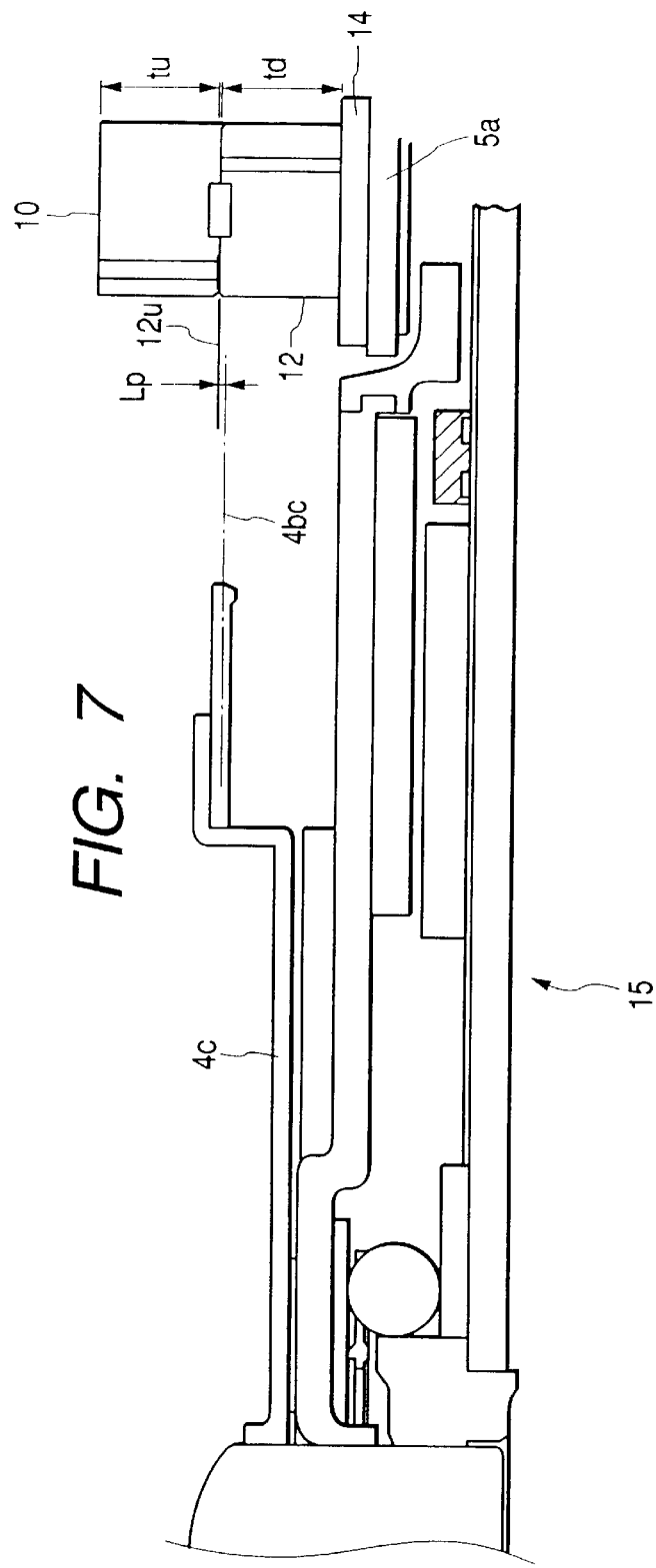
FIG. 7 is a side view of the magnetic heads and the floppy disk according to this embodiment.

As shown in FIG. 7, during recording and reproducing, the upper surface 12u of the lower magnetic head 12 is higher than the center rotating plane 4bc of the magnetic recording medium 4b by Lp=0.1 to 0.3 mm to provide a stable recoding and reproduction. This position relation is referred to as penetration (offset). Generally, this position relation varies with the configuration of the magnetic head, the method of supporting the magnetic head, a head load on the magnetic recording medium 4b. In this embodiment, as shown in FIG. 7, because the lower magnetic head 12 is fixed, Lp=0 to 0.3 mm to provide a stable output.

Recently, demand for miniaturizing and reducing the thickness of a floppy disk drive has been increased. Thus, the general size of the 3.5 inch type of floppy disk drive units shifts from one inch to ½-inch size. Thus, reducing the thickness of the magnetic head is also required.

In reducing the thickness of the magnetic heads, the dimension of the penetration Lp=0.1 to 0.3 mm cannot be neglected.

In this embodiment, adding the mounting plate 14 between the lower magnetic head 12 and the carriage 5a provides the penetration. The lower magnetic head 12 is fixed to the carriage 5a. Thus, it is possible to make the thickness tu of the upper magnetic head 10 equal to the thickness td of the lower magnetic head 12, because the same magnetic head parts are commonly used between the upper magnetic head 10 and the lower magnetic head 12, so that the manufacturing cost can be reduced.

Figure 8:
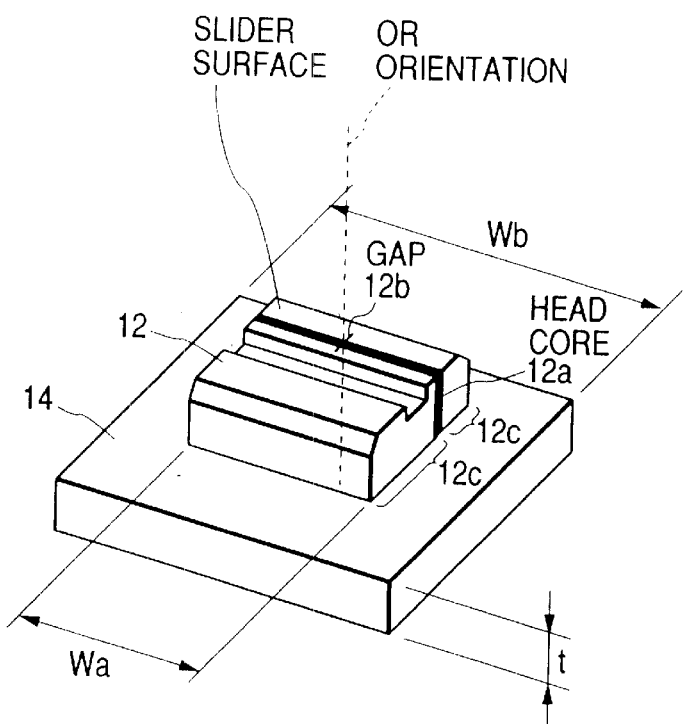
FIG. 8 is a perspective view of the mounting plate and the lower magnetic head according to this embodiment.
Figure 9A:
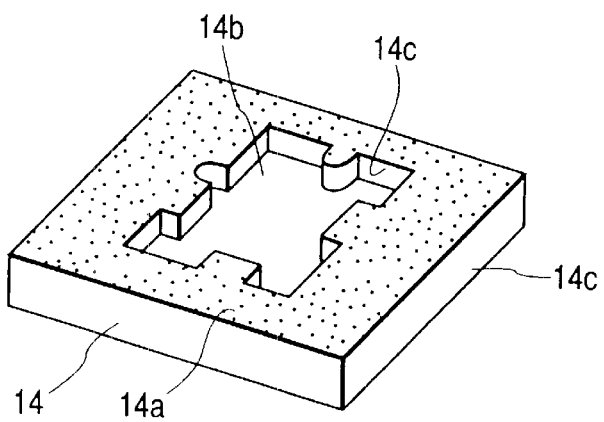
FIG. 9A is a perspective bottom view of the mounting plate with a through hole.

FIG. 8 shows the mounting plate 14 and the lower magnetic head 12 fixed on the mounting plate 14. FIG. 9A shows the mounting plate 14 with a through hole 14b. The mounting plate 14 is made of a non-magnetic stainless steel or a beryllium copper and has a through hole 14b for positioning the lower magnetic head 12 and for passing lead wires of the winding in the lower magnetic head 12 therethrough. The thickness of the mounting plate 14 is accurate and constant because of punching processing. In FIG. 9A, the mounting plate 14 has been punched (cut) by a press and has punched cutting surfaces 14c.

The lower magnetic head 12 (the upper magnetic head 10) used in this embodiment is one of tunnel erase type (bulk type) of slider heads and mode of soft-magnetic ferrite. More specifically, in this embodiment, the head core 12a is made of Mn—Zn type of ferrite having a gap 12b. The magnetic core 12a is sandwiched between sliders 12c made of Ti—Ca type of ceramic. The core 12a may be made of Ni—Zn type ferrite or polycrystalline or single crystal ferrite. Moreover, the slider 12c may be made of Ti—Ba type of ceramic in consideration of thermal expansion coefficients. Further, the upper shape and the roughness of the top surface of the slider 12c are selectable.

It is assumed that the width of the lower magnetic head 12 is Wa, the width of the shutter window 4h is Wc, and the width of the mounting plate is Wb. The width Wb is determined such that Wa<Wb<Wc. More specifically, Wa=5.6 mm, Wb=10 mm, and Wc=12 mm.

These dimensions make it easy to fix the lower magnetic head 12 to the mounting plate 14 because the mounting plate 14 has the width Wb which is greater than the width Wa of the lower magnetic head 12. Moreover, the width Wa of the lower magnetic head 12 is smaller than the width Wc of the shutter opening 4g by 5 mm even. Thus, this arrangement prevents that the shutter 4f disturbs motion and position of the lower magnetic head 12. Moreover, this arrangement prevents troubles in the arrangement of the flexible cable 11 for the lower magnetic head 12 and in drawing the leads of the coil winding.

Moreover, the thickness of the mounting plate is 0.3 mm. On the other hand, the thickness of the shutter is 0.2 mm. Thus, the shutter 4f does not disturb the position and movement of the mounting plate 14. This arrangement provides a stable contact between the lower magnetic head 12 and the magnetic recording medium 4b. Accordingly, there is almost no reading error. Particularly, it has been experienced that application of vibration of 0.6 G develops almost no error.

Figure 9B:
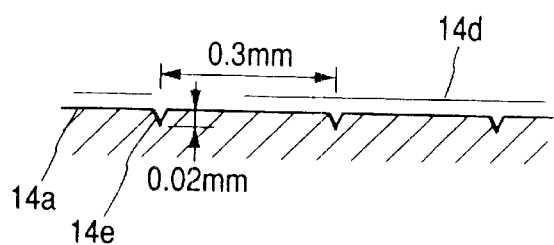
FIG. 9B is a partial cross-sectional view of the mounting plate shown in FIG. 9A.

FIG. 9B is a cross-sectional view of the mounting plate 14. The mounting surface of the mounting plate 14 has a rough area 14a for adhering. That is, the mounting surface is processed to have star-shape-stamped holes 14e. The depth of each holes 14e is 0.02 mm with 0.3 mm pitch to provide roughness of about 25S (25 μmR max). The mounting plate 14 is fixed to the carriage 5a with adhesive. The resultant adhesive strength reaches 1800 gf, so that the strength of adhering becomes three times that (500 gf) of no rough area. In other words, the thickness of an adhesive layer 14d between the mounting plate 14 and the carriage 5a is made thin, so that the total thickness accuracy is increased. Further, providing the rough area 14a prevents adhesive to flow from the rough area 14a during or after fixing.

The orientation of the lower magnetic head 12 is fixed because the lower magnetic head 12 is adhered to the mounting plate 14 and then, the mounting plate 14 is adhered to the carriage 5a without the gimbal.

Figure 10A:
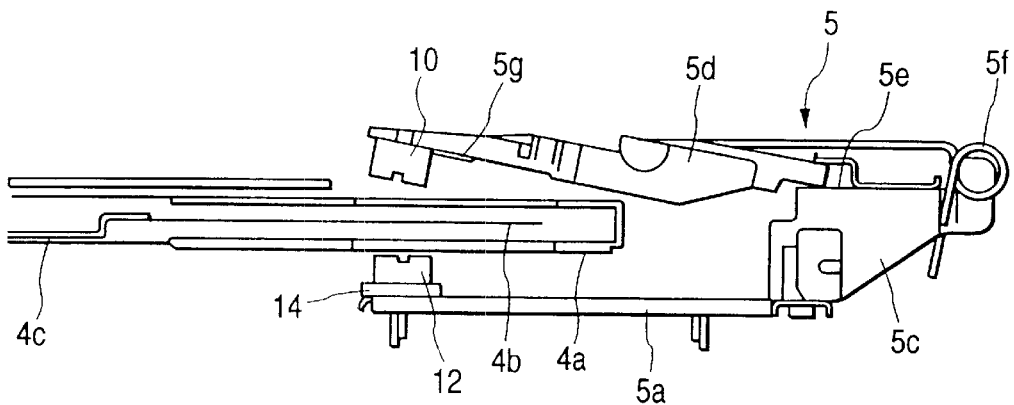
FIGS. 10A and 10B show operation conditions of the upper arm according to this embodiment.
Figure 10B:
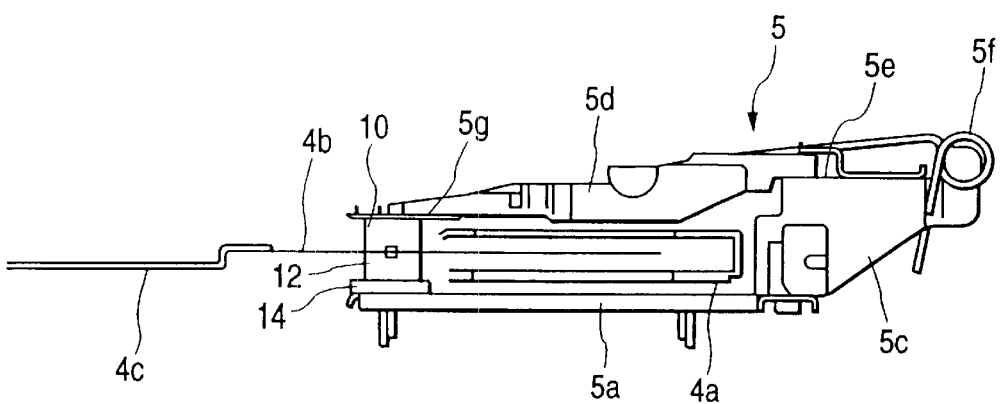
Figure 11:
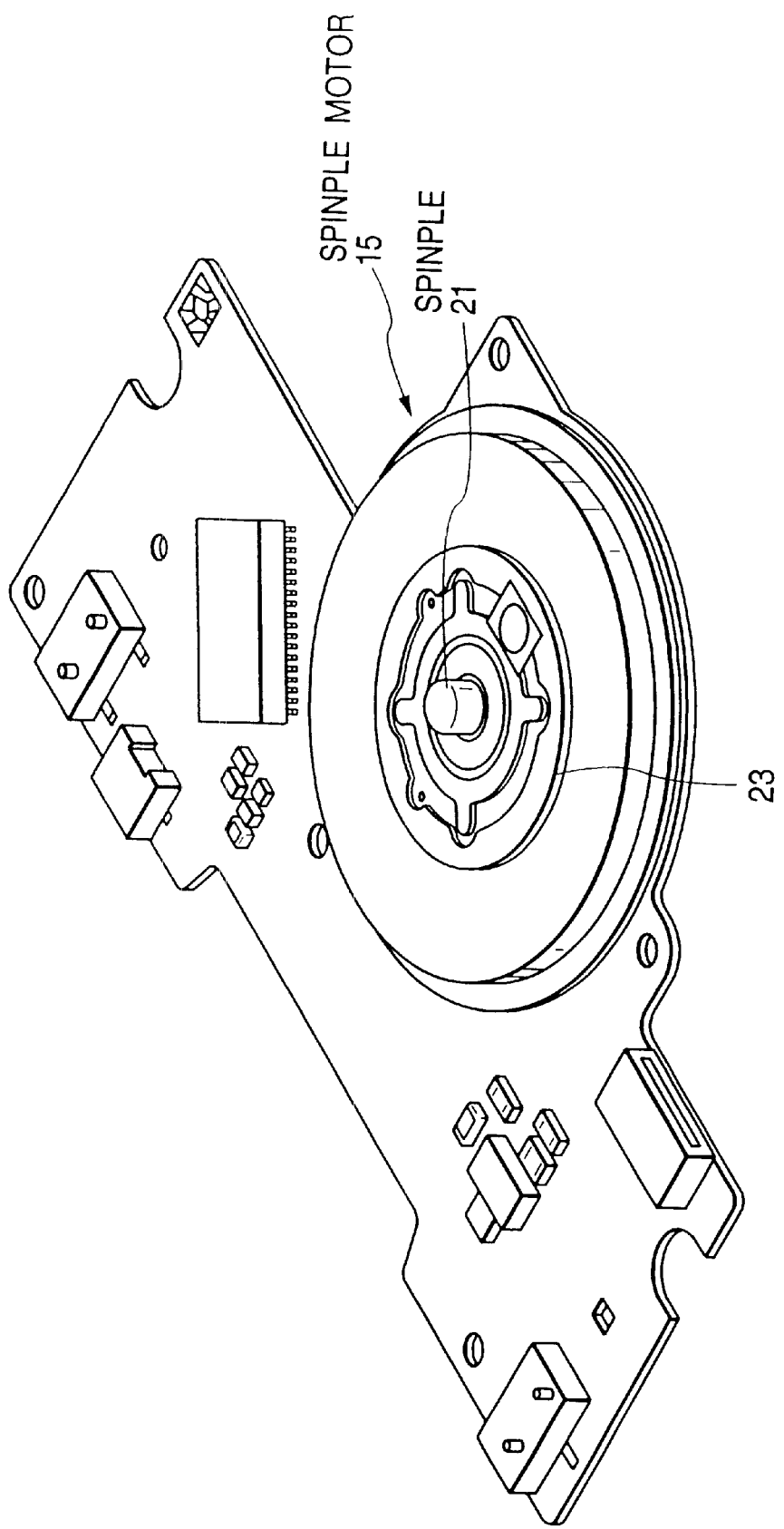
FIG. 11 is a perspective view of the control circuit on a printed circuit board and a spindle motor according to this embodiment.

FIGS. 10A and 10B show operation conditions of the upper arm 5d. That is, the arm 5d having the upper magnetic head 10 is upwardly opened by the spring 5f when no floppy disk is inserted. When a floppy disk 4 is inserted, the shutter covering the opening of the cartridge 4a is opened and the tip of the arm 5d moves downwardly, so the upper magnetic head 10 fixed to the arm 5d and the lower magnetic head 12 and the mounting plate 14 enters the cartridge 4a through the shutter window 4h.

Next, the upper and lower magnetic heads 10 and 12 pinch the magnetic recording medium 4b rotated by the spindle motor 15 as shown in FIG. 10B. Moreover, the upper and the lower magnetic heads 10 and 12 are radially shifted to seek the track on the magnetic recording medium 4b to read and record data on the recording medium 4b.

The mounting plate 14 has a flatness of 0.015 mm by finishing. That is, accurate thickness of the mounting plate 14 provides a higher accuracy in the height of the magnetic head 12 from the carriage 5a than the accuracy that would be provided with a protruding portion by the pressing. The constant thickness t of the mounting plate 14 provides the accurate penetration arrangement, so the common parts can be used for the upper and lower magnetic heads 10 and 12. Moreover, the rough area 14a increases the adhering strength and the rough surface is provided with small holes 14e on the surface of the mounting plate 14, so adhesive exists in the small holes, so that the height of the lower magnetic head 12 is not influenced by the adhesive layer 14d between the mounting plate and the base plate 1. That is, the accuracy in height of the lower magnetic head 12 from the carriage 5a is provided with tolerance of about 0.2 mm and accumulation of errors in accuracy is prevented.

As mentioned above, according to the embodiment of this invention, for the upper and lower magnetic heads 10 and 12 common magnetic heads are used. Thus, the height of the first magnetic head is equal to that of the second magnetic heads. The mounting plate 14 is provided between the lower magnetic head 12 and the carriage 5a to provide penetration arrangement. The lower magnetic head 12 is fixed on the carriage 5a through the mounting plate 14 with adhesive 14d. The mounting plate 14 has the rough area having small holes 14e to provide surely adhering the mounting plate 14 with accuracy. That is, the thickness of the adhering layer 14d is made small, so that the total thickness is accurate. An accurate height of the lower magnetic head for penetration is provided because the thickness t of the mounting plate 14 is accurate because of punching processing. Moreover, the thickness of the mounting plate 14 is greater than that of the shutter 4f. The width Wb of the mounting plate 14 is greater than the width Wa of the lower magnetic head 12 but smaller than the width Wc of the shutter opening 4g of the floppy disk cartridge 4a.

As mentioned, the upper arm 5d and the carriage 51 is symmetrically arranged with respect to the center plane 4bc of the recording medium disk 4b (the center plane of floppy disk cartridge). That is, the distance between the upper surface of the cartridge 4a and the arm 5d is equal to the distance between the lower surface of the cartridge 4a and the carriage 5a. The mounting plate 14 is provided between said lower magnetic head 12 and the carriage 51 has a predetermined thickness 5 and the predetermined width Wd in the tangent direction of said floppy disk (direction B) which is greater than that Wa of the lower magnetic head 12 and smaller than that Wc of said shutter. The upper and lower magnetic heads 10 and 12 include common magnetic heads having the same height in a direction perpendicular to the rotating plane of the magnetic recording medium 4b. The lower magnetic head is fixed on the carriage 5a through the mounting plate 14 which provides penetration of said lower magnetic head to the recording medium disk 4b toward said upper magnetic head 10, wherein orientation of the lower magnetic head 12 is fixed.

What is claimed is:

1. A floppy disk drive unit comprising:
    floppy disk supporting means for rotatably supporting a recording medium disk in a floppy disk cartridge having a shutter slidably covering a window opening for accessing said recording medium, the window opening having a predetermined width in a window width direction and the recording medium disk having tracks arranged in a radial direction;
    a head cartridge assembly which is movable in the radial direction in which the tracks of said recording medium disk are arranged including:
    lower and upper magnetic heads;
    a carriage and an upper arm, said upper arm and said carriage being symmetrically arranged with respect to a center plane of said floppy disk cartridge which is parallel to a rotating plane of said recording medium disk, supporting said lower and upper magnetic heads at their tips, respectively, and pinching said recording medium disk with said lower and upper magnetic heads when the floppy disk cartridge is loaded into the floppy disk drive, said lower and upper magnetic heads having a common head width; and a mounting plate between said lower magnetic head and said, carriage having a predetermined constant thickness and a predetermined width in a direction parallel to the window width direction when the floppy disk cartridge is loaded into the floppy disk drive, which is greater than the head width of said lower magnetic head and smaller than the window opening width, wherein said upper and lower magnetic heads are of a common part type for interchangeability, the upper and lower magnetic heads have a same height in a direction perpendicular to said rotating plane, and said lower magnetic head is fixed on said carriage through said mounting plate to effect penetration of said lower magnetic head to said recording medium disk toward said upper magnetic head from said rotating plane by said predetermined constant thickness, when the floppy disk cartridge is loaded into the floppy disk drive and provide a fixed orientation of said lower magnetic head with respect to said recording medium disk.

2. The floppy disk drive unit as claimed in claim 1, wherein said predetermined thickness is greater than the thickness of said shutter.

3. The floppy disk drive unit as claimed in claim 1, wherein said mounting plate comprises a punched plate.

4. The floppy disk drive unit as claimed in claim 1, wherein a surface of said mounting plate on which said carriage is fixed has a rough area including holes in said mounting plate and said head carriage assembly further includes an adhesive layer for adhering said rough area to said carriage.

5. The floppy disk drive unit as claimed in claim 1, wherein said upper arm further includes a gimbal plate and said upper magnetic head is fixed on said upper arm through said gimbal plate.

6. The floppy disk drive unit as claimed in claim 1, wherein said mounting plate has a through hole for positioning the lower magnetic head.

* * * * *